UNITED STATES PATENT OFFICE.

CARL CASPAR, OF STUTTGART, GERMANY.

PROCESS OF MANUFACTURING CRUCIBLE COMPOUNDS.

No. 886,111.    Specification of Letters Patent.    Patented April 28, 1908.

Application filed January 6, 1908. Serial No. 409,566.

*To all whom it may concern:*

Be it known that I, CARL CASPAR, a citizen of the German Empire, residing at Stuttgart, Würtemberg, Germany, have invented certain new and useful Improvements in Processes of Manufacturing Crucible Compounds; and I do hereby declare the following to be a full, clear, and exact description of the invention, such as will enable others skilled in the art to which it appertains to make and use the same.

When refractory metals are to be melted in crucibles with high and very thin walls at very high temperatures, which metals must not absorb carbon and silicon from the walls of these vessels, and which are to be purified by highly basic fluxes, these walls must not only be free from carbon and deleterious constituents but must also be of a basic nature.

In order however to easily form the high and thin walls and to make perfect vessels, it must be possible to give to the basic substance employed therefor, the mechanical properties of potters' clay. This is only possible if it already contains in a dried pulverulent condition a considerable quantity of very fireproof, greasy, binding clay thoroughly mixed with it, so that when worked up with a certain quantity of water, it assumes an easily molded and very ductile pasty condition. This fireproof binding clay however consists principally of silicic acid, which, in this way, enters the basic material of the vessel walls. At the high smelting heat it is attacked by the basic constituents of this material itself and also those of the additions, and the molten or melting metals may react on their silicon contents. On the other hand it and the binding clay must be protected. This can only be done in the most complete manner possible, by means of the delicate pure powder of pure amorphous aluminium oxid $Al_2O_3$, which already in the proportion of 76 equivalents to 24 equivalents of powdered alumina forms a highly fireproof, easily moldable or ductile substance of slightly basic character, which burned at an incandescent heat becomes firm and hard. This is then either treated alone, or, in order to make it highly basic, there is mixed with it for instance 26% of binding clay with 24% aluminium oxid and 50% pure calcined magnesite which is more coarsely powdered than the two other substances which are almost as fine as flour. According to circumstances, dolomite or magnesia or lime or the like, may be added, all as chemically pure as possible.

No single one of the ordinary and existing forms of $Al_2O_3$ is available for the said objects, but such must be prepared in a new and expensive way, which however is still preferable for these valuable crucibles, but is much too dear for all other commoner, fireproof products such as bricks, molded blocks, stove linings, and the like. Calcined bauxite, preferably consisting of $Al_2O_3$, is too impure and much too hard, so that it very greatly affects the capability of the material to be easily molded and its capability of protecting the binding clay. The two latter defects are possessed by natural and artificial corundum and crystalline $Al_2O_3$, two chemical actually non-susceptible substances, to a still greater extent.

The pure amorphous $Al_2O_3$ finally can only be rendered incandescent so far as suffices for the already mentioned fireproof, coarser products, but not so far that its property of again chemically combining with water, is entirely lost. At an incandescent heat this pulverulent body is so disintegrated by the escaping vapor and thereby rendered so poor a conductor of heat, that heating to a higher temperature is much too costly and inconvenient. At high temperatures however the last remains of the chemically combined water escaping as hot, high pressure, steam would not only very seriously damage the walls of the crucibles, but by its decomposition in the fluid metal, would produce dangerous and deleterious reactions between the water and the silicon, by which silicon would be introduced into the metal which might make this latter brittle owing to the oxid. All these drawbacks are entirely removed by the following improved method of heating. By the addition of water, rounded pieces of half-fist size, are formed from pure amorphous hydrate of alumina $Al_2O_6$, which dry well and thereby become solid and conductors of heat, and in consequence of the added water being drawn off remain so porous, that even at a high temperature all the chemically combined water can easily escape. With these dried pieces suitable crucibles are entirely filled and then gradually heated in suitable furnaces to an intense, white heat, approximating to 1600° C. and left therein for about 1½ hours. They are then allowed to cool, closed, in order to prevent access of air, then discharged and the pieces ground to a fine powder which is passed through a sieve of from 1—1½ millimeters mesh after which the powder is ready for use.

I declare that what I claim is:—

1. The described process of manufacturing crucible compounds, consisting in shaping small pieces of pure, amorphous, hydrate of alumina by the addition of water, drying and then heating gradually in a closed vessel up to an intense white heat, and then cooling.

2. The described process of manufacturing crucible compounds, consisting in shaping small pieces of pure, amorphous, hydrate of alumina by the addition of water, drying and then heating gradually in a closed vessel up to an intense white heat, and maintaining at this temperature for a definite period, then cooling without access of air.

3. The improved process for manufacturing crucible compounds which consists in shaping small pieces of pure, amorphous, hydrate of alumina, and pure magnesia by the addition of water, drying, and then heating in a closed vessel, gradually to intense white heat, maintaining such temperature for a definite period, then cooling without access of air.

In testimony whereof I affix my signature, in presence of two witnesses.

CARL CASPAR.

Witnesses:
  JEAN GULDEN,
  HERM. HOPPE.